(12) United States Patent
Michal et al.

(10) Patent No.: US 10,833,588 B2
(45) Date of Patent: Nov. 10, 2020

(54) VOLTAGE CONVERTER POWER STAGE

(71) Applicant: Infineon Technologies AG, Neubiberg (DE)

(72) Inventors: Vratislav Michal, Villach (AT); Kyrylo Cherniak, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/372,781

(22) Filed: Apr. 2, 2019

(65) Prior Publication Data

US 2020/0321868 A1 Oct. 8, 2020

(51) Int. Cl.
*H02M 3/158* (2006.01)

(52) U.S. Cl.
CPC ....... *H02M 3/1582* (2013.01); *H02M 3/1584* (2013.01)

(58) Field of Classification Search
CPC ...... G05F 3/08; H02M 3/1582; H02M 3/1584
See application file for complete search history.

(56) References Cited

U.S. PATENT DOCUMENTS

| | | | |
|---|---|---|---|
| 7,230,405 B2 | 6/2007 | Jang et al. | |
| 2016/0261190 A1* | 9/2016 | Shenoy | H02M 3/158 |
| 2018/0175726 A1* | 6/2018 | Petersen | H02M 3/07 |
| 2019/0348913 A1* | 11/2019 | Zhang | H02M 1/08 |

* cited by examiner

*Primary Examiner* — Jue Zhang
*Assistant Examiner* — Trinh Q Dang
(74) *Attorney, Agent, or Firm* — Schiff Hardin LLP

(57) ABSTRACT

A power stage of a voltage converter, including: a series capacitor having a first terminal coupled to a first switch node; a pair of second high-side switches coupled in series between a second switch node and a second terminal of the series capacitor; and a bias switch coupled between the first switch node and a middle node between the second high-side switches, wherein during operation, a voltage across each of the second high-side switches and the bias switch is less than a supply voltage.

20 Claims, 7 Drawing Sheets

100
Voltage Converter
(Series Capacitor Buck Converter)

100
Voltage Converter
(Series Capacitor Buck Converter)

200A
Voltage Converter
During First Switching Interval φ₁

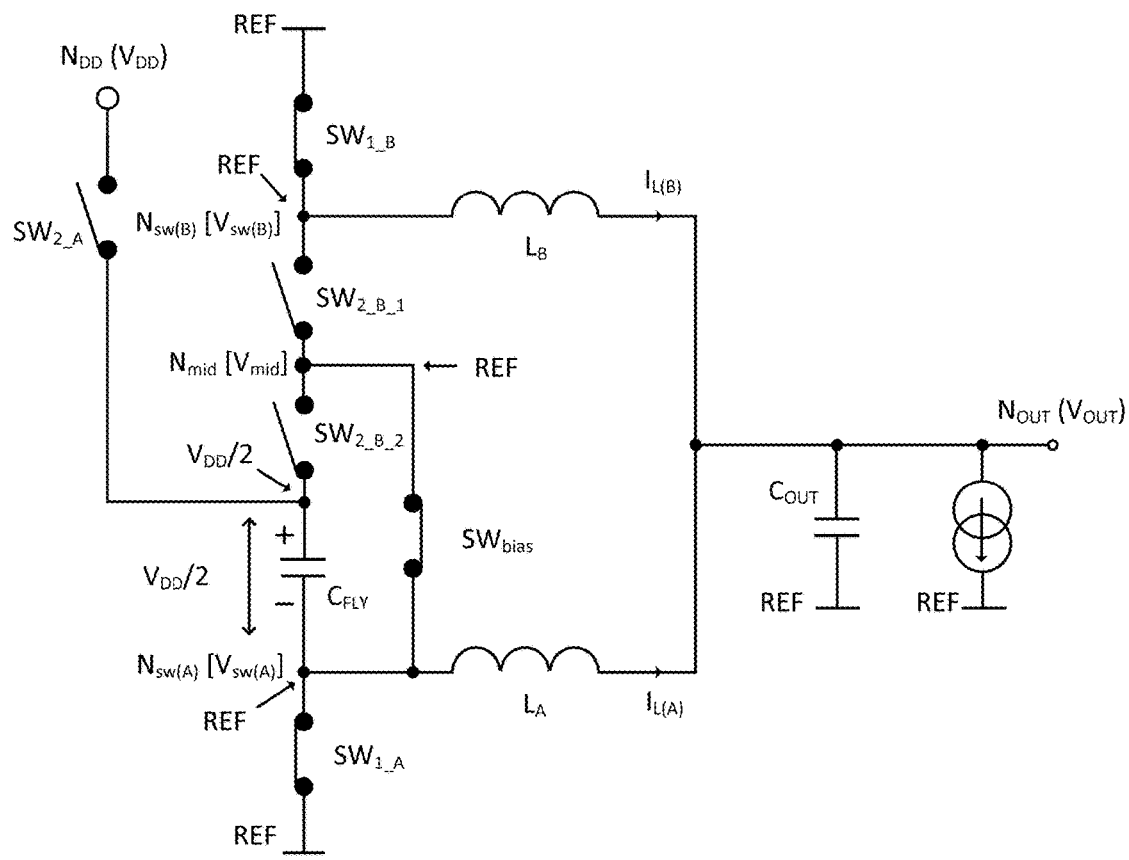

200C
Voltage Converter
During Third Switching Interval $\phi_3$

300
Voltage Converter
(Series Capacitor Boost Converter)

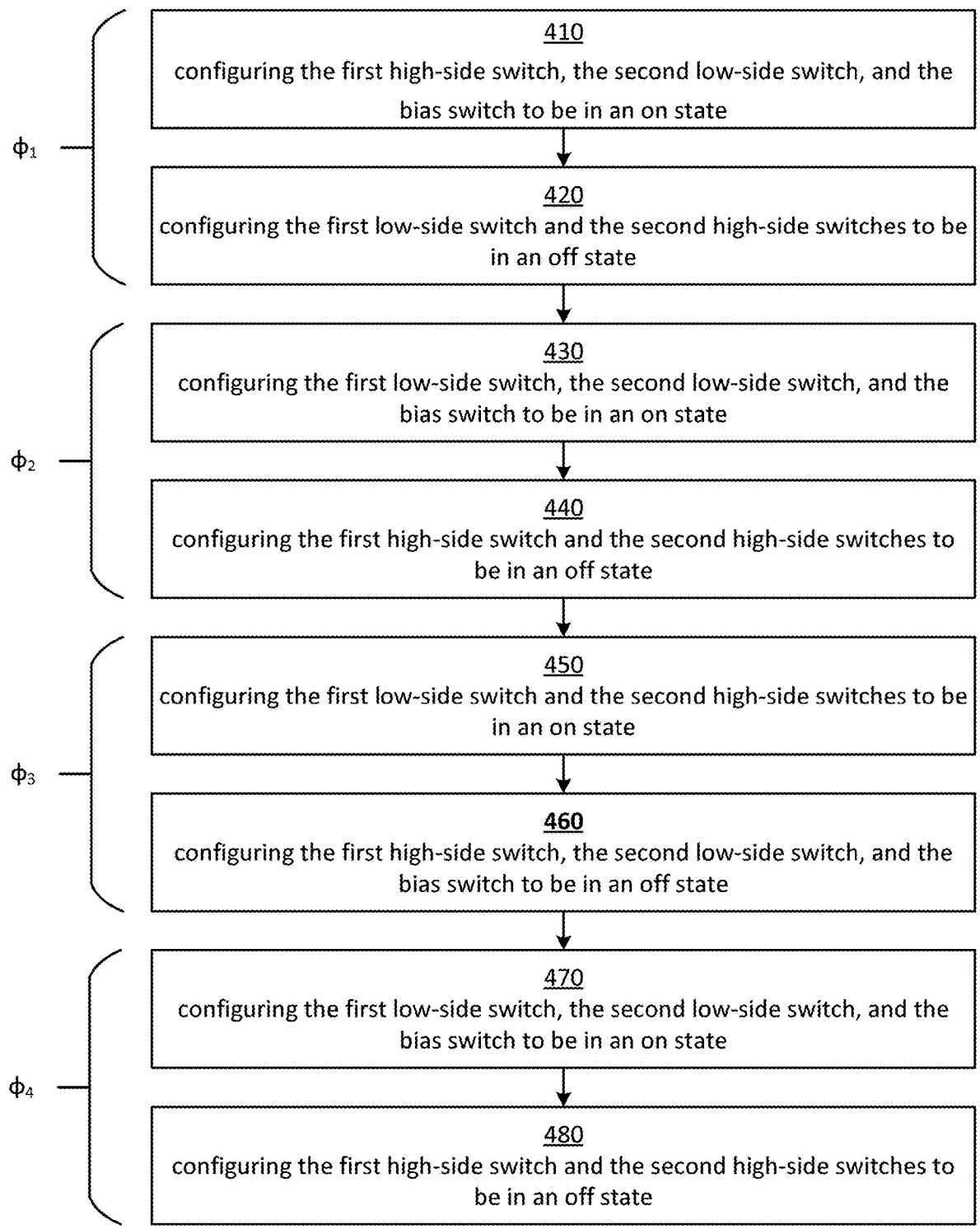

US 10,833,588 B2

VOLTAGE CONVERTER POWER STAGE

BACKGROUND

Voltage converters, such as those used in mobile or automotive applications, are a significant factor in product cost, power efficiency, portability, and reliability. Types of voltage converters include series capacitor buck (step-down) converters and series capacitor boost (step-up) converters. These converters have a power stage with a high-voltage (full-power supply) switch that limits input-output voltage range and increases size and cost.

BRIEF DESCRIPTION OF THE DRAWINGS

FIGS. 2A-2C illustrate the voltage converter of FIG. 1 during switching intervals.

FIG. 4 illustrates a flowchart of a method of operating a power stage of the voltage converters of FIGS. 1 and 3.

DETAILED DESCRIPTION

The present disclosure is directed to a power stage of a voltage converter in which during operation, a voltage across each of its switches is less than a supply voltage. The switches may be referred to as low-voltage switches. The power stage requires switches having a lower voltage rating, and is more efficient due to less ohmic and dynamic power dissipation.

Figure 1:
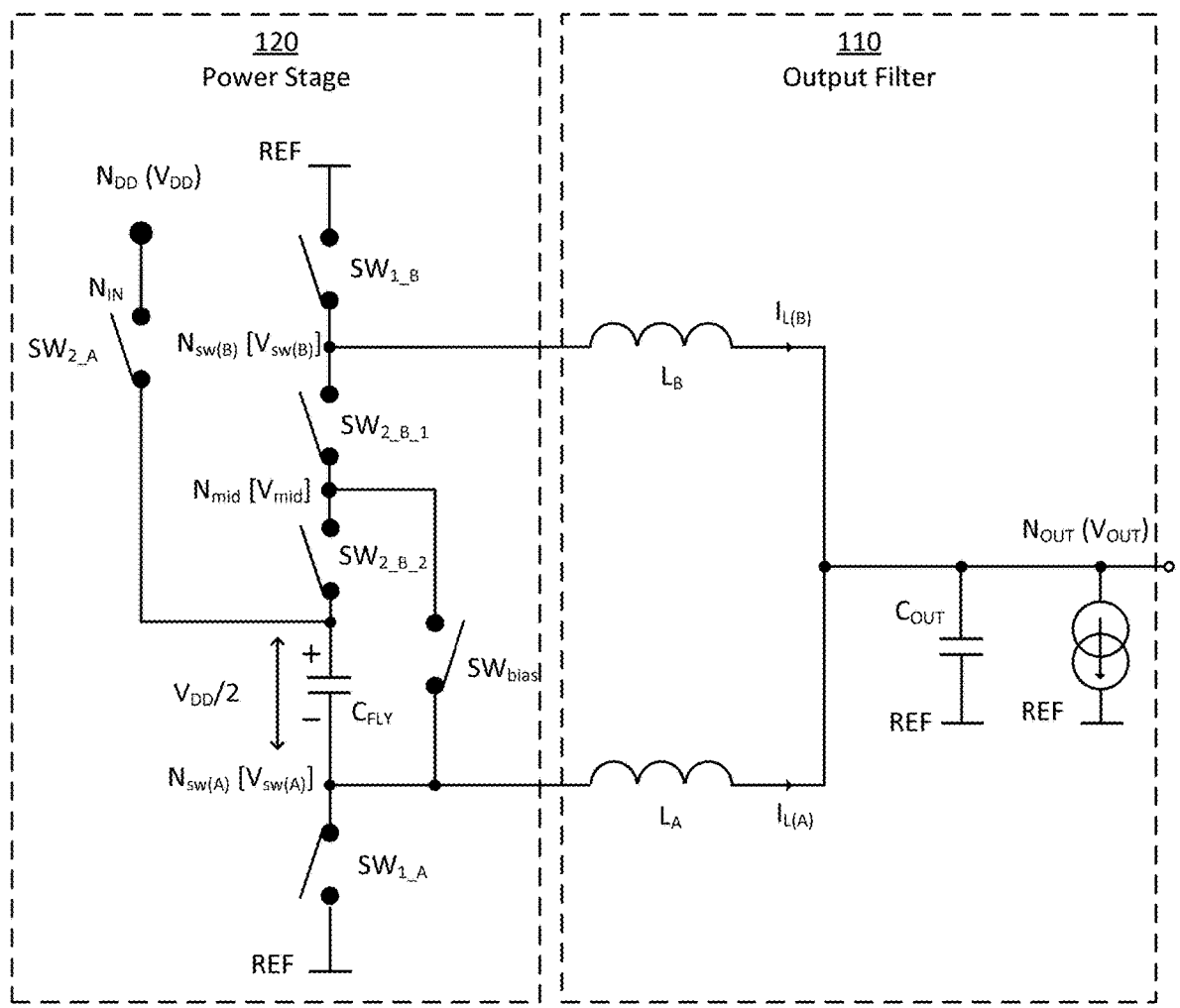
FIG. 1 illustrates a voltage converter in accordance with aspects of the disclosure.

FIG. 1 illustrates a voltage converter 100 in accordance with aspects of the disclosure. This type of voltage converter 100 is known as a multi-phase series capacitor buck converter.

The voltage converter 100 comprises an output filter 110 and a power stage 120.

The output filter 110 comprises a first inductor $L_A$, a second inductor $L_B$, and an output capacitor Coin. The first inductor $L_A$ is coupled between a first switch node $N_{SW(A)}$ of the power stage 120 and an output node $N_{OUT}$. The second inductor $L_B$ is coupled between a second switch node $N_{SW(B)}$ of the power stage 120 and the output node $N_{OUT}$. The output capacitor Coin is coupled between the output node $N_{OUT}$ and a reference potential REF. The reference potential REF may be ground.

Output filters of voltage converters are known, and for the sake of brevity, a further description of the output filter 110 is omitted here.

The power stage 120 comprises a series capacitor $C_{FLY}$, a first low-side switch $SW_{1\_A}$, a first high-side switch $SW_{2\_A}$, a second low-side switch $SW_{1\_B}$, a pair of second high-side switches $SW_{2\_B\_1}$, $SW_{2\_B\_2}$, and a bias switch $SW_{bias}$.

The series capacitor $C_{FLY}$ has a first terminal (−) coupled to the first switch node $N_{SW(A)}$. The pair of second high-side switches $SW_{2\_B\_1}$, $SW_{2\_B\_2}$ is coupled in series between the second switch node $N_{SW(B)}$ and a second terminal (+) of the series capacitor $C_{FLY}$. The bias switch $SW_{bias}$ is coupled between the first switch node $N_{SW(A)}$ and a middle node $N_{mid}$, which is between the second high-side switches $SW_{2\_B\_1}$, $SW_{2\_B\_2}$. In other words, the middle node $N_{mid}$ is defined as the connection point where the first one $SW_{2\_B\_1}$ of the pair of second high-side switches $SW_{2\_B\_1}$, $SW_{2\_B\_2}$ is coupled to the second one $SW_{2\_B\_2}$ of the pair of second high-side switches $SW_{2\_B\_1}$, $SW_{2\_B\_2}$.

Additionally, the first low-side switch $SW_{1\_A}$ is coupled between the first switch node $SW_{1\_A}$ and the reference potential REF. The second low-side switch $SW_{1\_B}$ is coupled between the second switch node $N_{SW(B)}$ and the reference potential REF. Since the voltage converter 100 is a buck converter, the first high-side switch $SW_{2\_A}$ is coupled between the second terminal (+) of the series capacitor $C_{FLY}$ and a supply node $N_{DD}$.

The first inductor $L_A$ is configured to be coupled to the reference potential REF by the first low-side switch only $SW_{1\_A}$. Similarly, the second inductor $L_B$ is configured to be coupled to the reference potential REF by the second low-side switch only $SW_{1\_B}$.

During operation, a voltage across each of the switches is less than the supply voltage $V_{DD}$. A middle node voltage $V_{mid}$ at the middle node $N_{mid}$ is biased by the bias switch $SW_{bias}$ to be maintained at less than the full supply voltage, and more specifically, to be at a reference potential REF or half the supply voltage $V_{DD}/2$, depending on the switching interval. Also, a voltage across each of the second high-side switches $SW_{2\_B\_1}$, $SW_{2\_B\_2}$ and the bias switch $SW_{bias}$ is less than the supply voltage $V_{DD}$. Throughout switching intervals, states of each of the second high-side switches $SW_{2\_B\_1}$, $SW_{2\_B\_2}$ is complementary to a state of the bias switch $SW_{bias}$.

Figure 2A:
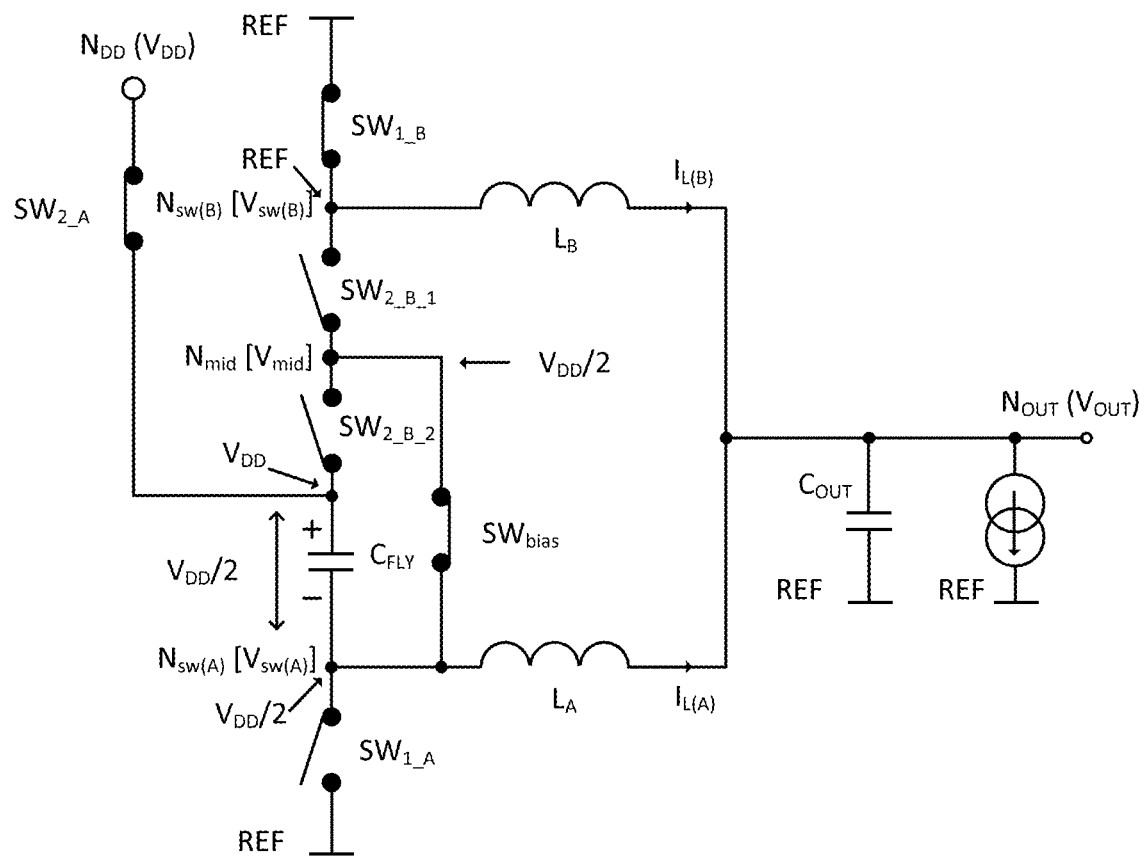
Figure 2C:
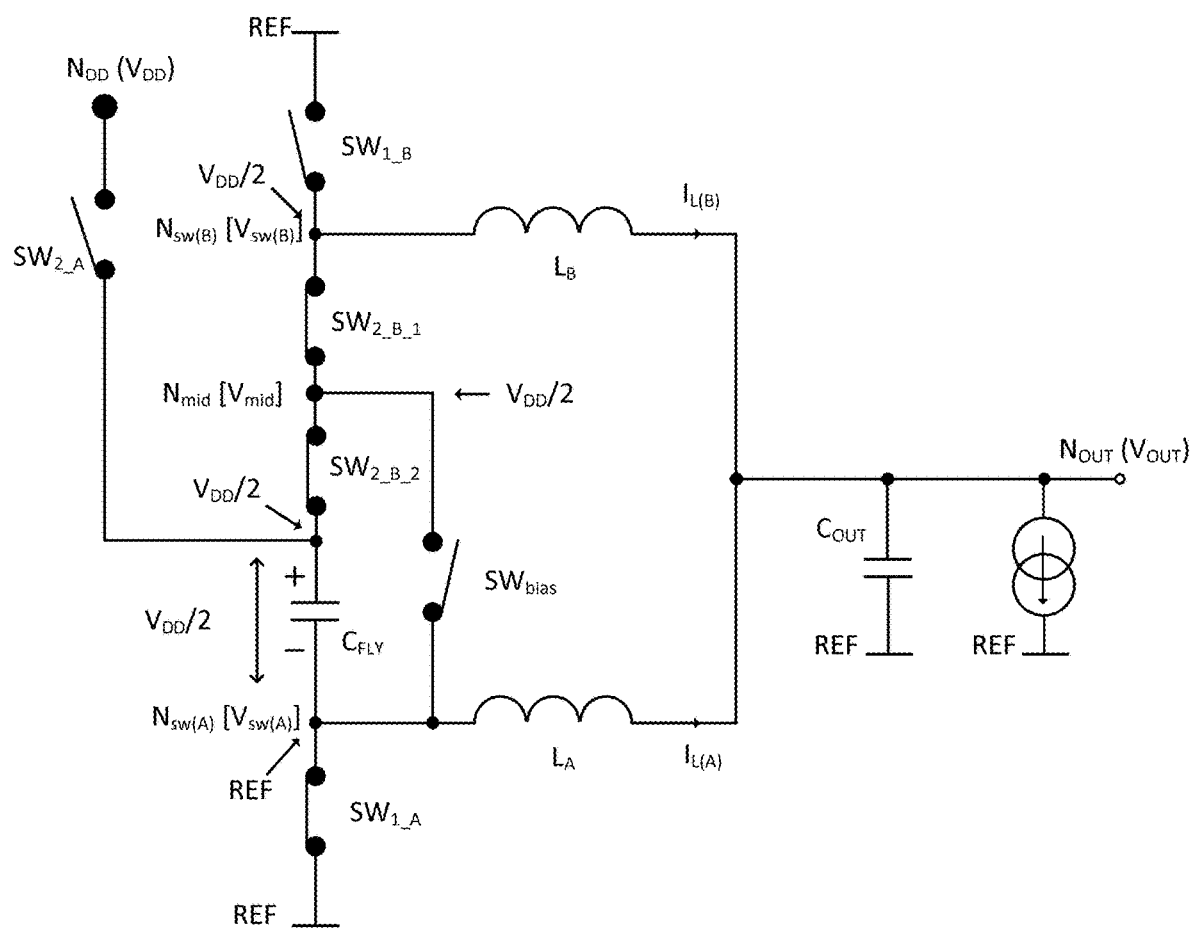
Figure 2D:
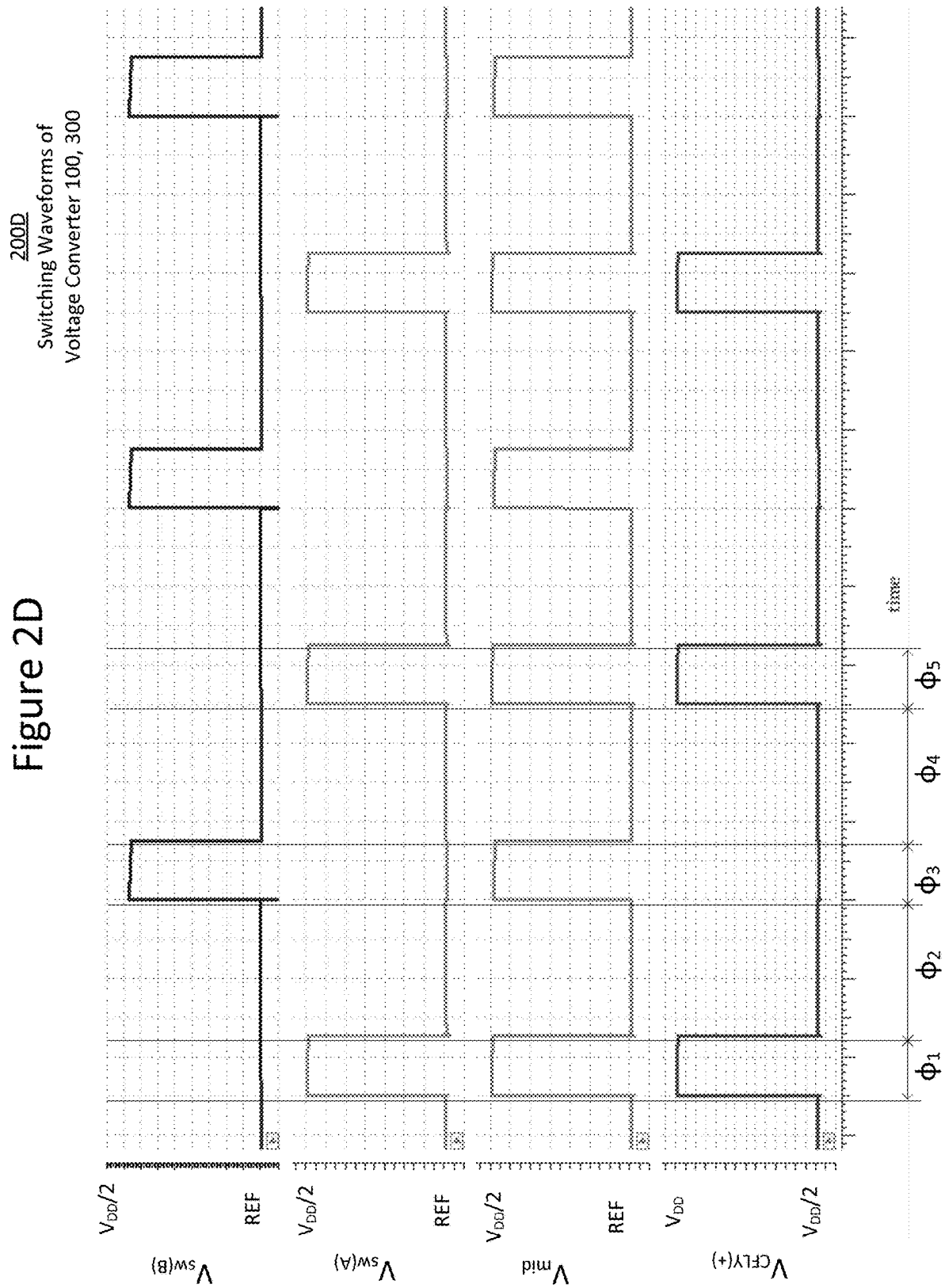
FIG. 2D illustrates switching waveforms of the power stage of the voltage converter of FIG. 1 during the switching intervals of FIGS. 2A-2C.

FIGS. 2A-2C illustrate the voltage converter 100 of FIG. 1 during its switching intervals $\phi_1$-$\phi_4$. FIG. 2D illustrates switching waveforms of the power stage 120 of the voltage converter 100 of FIG. 1 during the switching intervals $\phi_1$-$\phi_4$.

FIG. 2A illustrates the voltage converter 100 of FIG. 1 during the first switching interval $\phi_1$.

During the first switching interval $\phi_1$, the first high-side switch $SW_{2\_A}$, the second low-side switch $SW_{1\_B}$, and the bias switch $SW_{bias}$ are configured to be in an on state (closed). The first low-side switch $SW_{1\_A}$ and the second high-side switches $SW_{2\_B\_1}$, $SW_{2\_B\_2}$ are configured to be in an off state (open). As a result of these switch positions, the first inductor current $I_{L(A)}$ increases, the series capacitor $C_{FLY}$ is charged by the first inductor $L_A$ to one half the supply voltage $V_{DD}/2$, and the second inductor current $I_{L(B)}$ decreases. Also, the first switch node voltage $V_{SW(A)}$ is one half the supply voltage $V_{DD}/2$, and the second switch node voltage $V_{SW(B)}$ is at the reference potential REF.

The bias switch $SW_{bias}$ is configured to bias the middle node voltage $V_{mid}$, which is at the middle node $N_{mid}$ between the second high-side switches $SW_{2\_B\_1}$, $SW_{2\_B\_2}$, to the first switch node voltage $V_{SW(A)}$. This middle node voltage $V_{mid}$ enables sharing of the supply voltage $V_{DD}$ between the pair of second high-side switches $SW_{2\_B\_1}$, $SW_{2\_B\_2}$ such that voltages across each of these switches is substantially the same. The middle node $N_{mid}$ is thus maintained at low impedance, does not exceed maximum ratings of the pair of second high-side switches $SW_{2\_B\_1}$, $SW_{2\_B\_2}$, and satisfies gate driver power demands.

FIG. 2B illustrates the voltage converter 100 of FIG. 1 during both the second switching interval $\phi_2$ and the fourth switching interval $\phi_4$. The second and fourth switching intervals $\phi_2$, $\phi_4$ are identical.

During the second and fourth switching intervals $\phi_2$, $\phi_4$, the first low-side switch $SW_{1\_A}$, the second low-side switch $SW_{1\_B}$, and the bias switch $SW_{bias}$ are configured to be in an on state. The first high-side switch $SW_{2\_A}$ and the second high-side switches $SW_{2\_B\_1}$, $SW_{2\_B\_2}$ are configured to be in an off state. As a result, the first and second switch node voltages $V_{SW(A)}$, $V_{SW(B)}$ are at the reference potential REF, and the first and second inductor currents $I_{L(A)}$, $I_{L(B)}$ decrease. Because there is no current in the series capacitor $C_{FLY}$, its voltage remains constant.

FIG. 2C illustrates the voltage converter 100 of FIG. 1 during the third switching interval $\phi_3$.

During the third switching interval $\phi_3$, the first low-side switch $SW_{1\_A}$ and the second high-side switches $SW_{2\_B\_1}$, $SW_{2\_B\_2}$ are configured to be in an on state. The first high-side switch $SW_{2\_A}$, the second low-side switch $SW_{1\_B}$, and the bias switch $SW_{bias}$ are configured to be in an off state. As a result, the first switch node voltage $V_{SW(A)}$ is at the reference potential REF, and the second switch node voltage $V_{SW(B)}$ is one half the supply voltage $V_{DD}/2$. The series capacitor $C_{FLY}$ is discharged a small amount by the second inductor current $I_{L(B)}$, which rises during this time interval, and the series capacitor voltage decreases slightly.

FIG. 2D illustrates switching waveforms 200D of the power stage 120 of the voltage converter 100 of FIG. 1 during the switching intervals $\phi_1$-$\phi_4$ of FIGS. 2A-2C.

The switching waveforms 200D include the voltage $V_{CFLY(+)}$ at the second (+) terminal of the series capacitor $C_{FLY}$, the middle node voltage $V_{mid}$, the first switch node voltage $V_{SW(A)}$, and the second switch node voltage $V_{SW(B)}$.

From these switching waveforms, it is seen that during all switching intervals $\phi_1$-$\phi_4$, the voltages are well-defined and below supply voltage, and the switches are maintained in a safe operation area. The conduction times for the first low side switch $SW_{1\_A}$ and the second low side switch $SW_{1\_B}$ are relatively long. And since there is only a single return-to-reference potential device ($SW_{1\_A}$ or $SW_{1\_B}$) for each of the inductor currents $I_{L(A)}$, $I_{L(B)}$ as compared with previous power stages, there is a significant efficiency improvement.

The series capacitor $C_{FLY}$ continuously switches between the supply voltage $V_{DD}$ and the reference voltage. Continuous switching provides accurate balancing of half the supply voltage $V_{DD}/2$ across the series capacitor $C_{FLY}$. This balancing ensures accurate current sharing of the first inductor current $I_{L(A)}$ and the second inductor current $I_{L(B)}$, thereby avoiding a need for twice the implementation of expensive and typically inaccurate current sensors.

Figure 3:
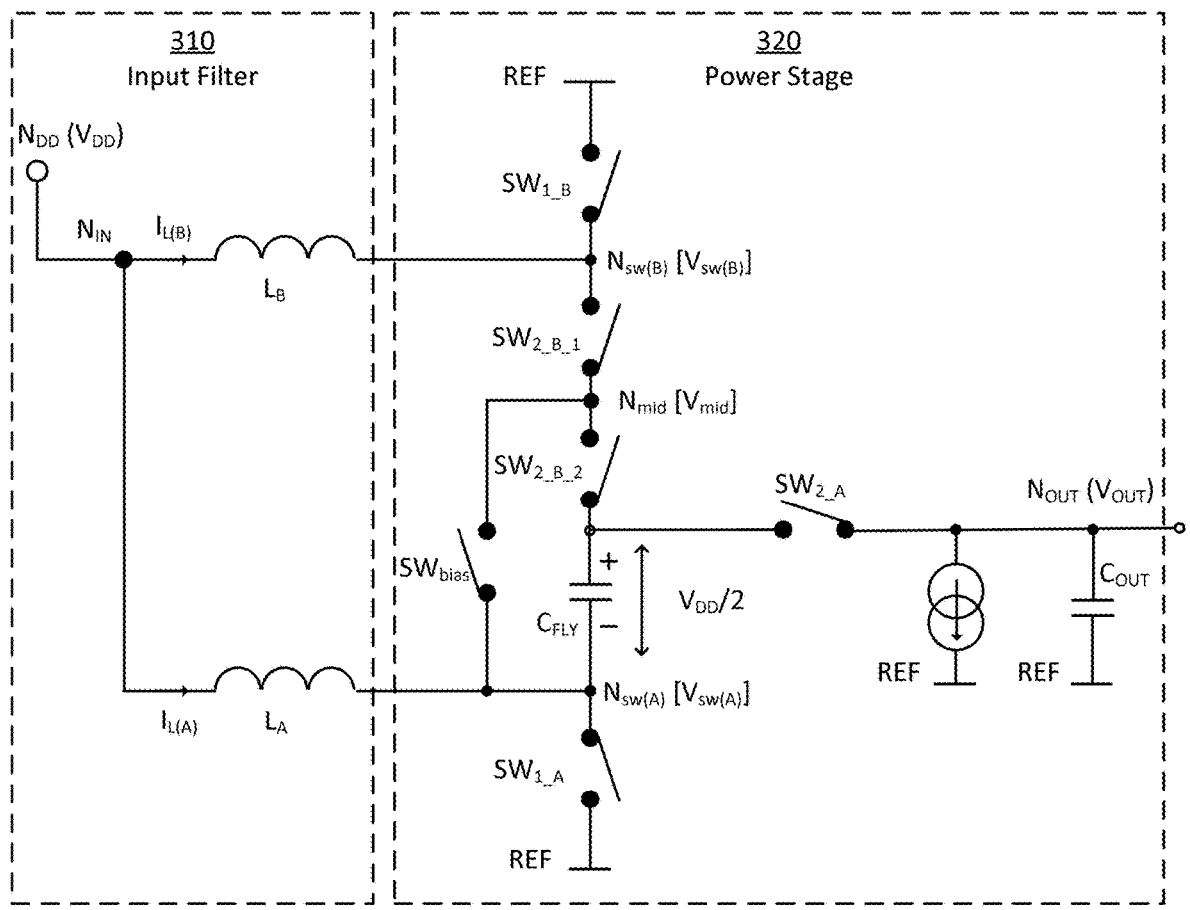
FIG. 3 illustrates another voltage converter in accordance with aspects of the disclosure.

FIG. 3 illustrates another voltage converter 300 in accordance with aspects of the disclosure.

The voltage converter 300 is a multi-phase series capacitor boost converter. This boost converter 300 is merely the buck converter 100 of FIG. 1, but with the input node $N_{IN}$ and output node $N_{OUT}$ exchanged. As a result, instead of the first high-side switch $SW_{2\_A}$ being coupled to the supply node $N_{DD}$ as in the buck converter 100 of FIG. 1, this switch $SW_{2\_A}$ is instead be coupled to the output node $N_{OUT}$. The first inductor $L_A$ is coupled between the first switch node $N_{SW(A)}$ and the input node $N_{IN}$, and is configured to be coupled to the reference potential REF by the first low-side switch $SW_{1\_A}$ only. The second inductor $L_B$ is coupled between the second switch node $N_{SW(B)}$ and the input node $N_{IN}$, and is configured to be coupled to the reference potential REF by the second low-side switch $SW_{1\_B}$ only.

The switching intervals $\phi_1$-$\phi_4$ of FIGS. 2A-2C and the switching waveforms 200D of FIG. 2D are equally applicable to this boost converter 300 of FIG. 3. For the sake of brevity, their descriptions are not repeated here.

The voltage converters 100, 300 are shown and described as being two-phase voltage converters, but the disclosure is not limited in this respect. The voltage converters 100, 300 may have any even number of phases formed by stacking two or more of one of the voltage converters 100, 300.

The series capacitor $C_{FLY}$ is described as having a first terminal as its negative terminal (−) and a second terminal as its positive terminal (+), but the disclosure is not limited in this respect. Alternatively, the first terminal may be the positive terminal (+) and the second terminal may be the negative terminal (−). A similar reverse in polarity may also be applicable to other circuit elements.

The voltage converters 100, 300 include switches. These switches may be implemented as Metal-Oxide-Semiconductor Field-Effect Transistors (MOSFETs), Bipolar Junction Transistors (BJTs), diodes, or any other type of circuit elements as suitable.

FIG. 4 illustrates a flowchart 400 of a method of operating a power stage of the voltage converters 100, 300 of FIGS. 1 and 3.

During a first switching interval $\phi_1$, the first high-side switch $SW_{2\_A}$, the second low-side switch $SW_{1\_B}$, and the bias switch $SW_{bias}$ are configured to be in an on state (Step 410). Also, the first low-side switch $SW_{1\_A}$ and the second high-side switches $SW_{2\_A\_1}$, $SW_{2\_A\_2}$ are configured to be in an off state (Step 420). This first switching interval $\phi_1$ is described in more detail above with respect to FIG. 2A.

During a second switching interval $\phi_2$, the first low-side switch $SW_{1\_A}$, the second low-side switch $SW_{1\_B}$, and the bias switch $SW_{bias}$ are configured to be in an on state (Step 430). Also, the first high-side switch $SW_{2\_A}$ and the second high-side switches $SW_{2\_A\_1}$, $SW_{2\_A\_2}$ are configured to be in an off state (Step 440). This second switching interval $\phi_2$ is described in more detail above with respect to FIG. 2B.

During a third switching interval $\phi_3$, the first low-side switch $SW_{1\_A}$ and the second high-side switches $SW_{2\_A\_1}$, $SW_{2\_A\_2}$ are configured to be in an on state (Step 450). Also, the first high-side switch $SW_{2\_A}$, the second low-side switch $SW_{1\_B}$, and the bias switch $SW_{bias}$ are configured to be in an off state (Step 460). This third switching interval $\phi_3$ is described in more detail above with respect to FIG. 2C.

The fourth switching interval $\phi_4$, is basically the same as the second switching interval $\phi_2$. During the fourth switching interval $\phi_4$, the first low-side switch $SW_{1\_A}$, the second low-side switch $SW_{1\_B}$, and the bias switch $SW_{bias}$ are configured to be in an on state (Step 470). Also, the first high-side switch $SW_{2\_A}$ and the second high-side switches $SW_{2\_A\_1}$, $SW_{2\_A\_2}$ are configured to be in an off state (Step 480). This fourth switching interval $\phi_4$ is described in more detail above with respect to FIG. 2B.

The power stages of this disclosure eliminate full supply voltage switches, that is, during operation, a voltage across each of the switches is less than the full supply voltage at any time. In one example, the voltage across each switch is equal to or less than one half the supply voltage. Therefore, all switches of the power stage may be designed to tolerate a maximum voltage of the full supply voltage or half the supply voltage, respectively. This results in a lower silicon area, as well as makes it possible to use less expensive technologies than as needed in high voltage applications. Also, the same output power is provided in a smaller form factor, which is important for volume-driven and/or cost-driven applications; there are only six active switches and a single series capacitor. Further, these power stages provide higher power efficiency, have a higher conversion ratio, are applicable to both low and high voltage range applications, decrease dynamic and static power dissipation, and maintain components within a safe operation area.

Inductor current ripple is reduced. Inductor DC current is also reduced, thereby allowing the use of low-profile inductors. The output capacitor ripple of buck converters is reduced, and as consequence, may have its value reduced or switching frequency increased. Inductor AC voltage is reduced, thereby reducing AC power dissipation on the inductors. There is accurate current sharing of inductor coil currents. And there is improved efficiency due to return of the inductor current to reference voltage/ground via a single power switch element.

Example 1

A power stage of a voltage converter, comprising: a series capacitor having a first terminal coupled to a first switch node; a pair of second high-side switches coupled in series between a second switch node and a second terminal of the series capacitor; and a bias switch coupled between the first switch node and a middle node between the second high-side switches, wherein during operation, a voltage across each of the second high-side switches and the bias switch is less than a supply voltage.

Example 2

The power stage of example 1, further comprising: a first low-side switch coupled between the first switch node and a reference potential; a second low-side switch coupled between the second switch node and the reference potential; and a first high-side switch coupled between the second terminal of the series capacitor and either a supply node when the voltage converter is a buck converter or an output node when the voltage converter is a boost converter.

Example 3

The power stage of any combination of examples 1 and 2, wherein during a first switching interval, the first high-side switch, the second low-side switch, and the bias switch are configured to be in an on state, and the first low-side switch and the second high-side switches are configured to be in an off state, such that the first switch node voltage is one half the supply voltage, and the second switch node voltage is at the reference potential.

Example 4

The power stage of any combination of examples 1-3, wherein during the first switching interval, the bias switch is configured to bias a voltage at the middle node to the first switch node voltage, such that voltages across each of the second high-side switches are substantially the same.

Example 5

The power stage of any combination of examples 1-4, wherein during a second switching interval, the first low-side switch, the second low-side switch, and the bias switch are configured to be in an on state, and the first high-side switch and the second high-side switches are configured to be in an off state, such that the first and second switch node voltages are at the reference potential.

Example 6

The power stage of any combination of examples 1-5, wherein during a third switching interval, the first low-side switch and the second high-side switches are configured to be in an on state, and the first high-side switch, the second low-side switch, and the bias switch are configured to be in an off state, such that the first switch node voltage is at the reference potential and the second switch node voltage is one half the supply voltage.

Example 7

The power stage of any combination of examples 1-6, wherein during a fourth switching interval the first low-side switch, the second low-side switch, and the bias switch are configured to be in an on state, and the first high-side switch and the second high-side switches are configured to be in an off state, such that the first and second switch node voltages are at the reference potential.

Example 8

The power stage of any combination of examples 1-7, wherein during operation, a voltage across each of the switches is less than the supply voltage.

Example 9

The power stage of any combination of examples 1-8, wherein during operation, a voltage at the middle node is configured to be maintained at less than the full supply voltage.

Example 10

The power stage of any combination of examples 1-9, wherein during operation, a voltage at the middle node is biased by the bias switch to be at a reference potential or half the supply voltage.

Example 11

A buck converter for converting an input voltage to an output voltage, comprising: a power stage comprising: a series capacitor having a first terminal coupled to a first switch node; a pair of second high-side switches coupled in series between a second switch node and a second terminal of the series capacitor; a bias switch coupled between the first switch node and a middle node between the second high-side switches, wherein during operation, a voltage across each of the second high-side switches and the bias switch is less than a supply voltage; a first inductor coupled between the first switch node and an output node; and a second inductor coupled between the second switch node and the output node.

Example 12

The buck converter of example 11, wherein: the first inductor is configured to be coupled to a reference potential by the first low-side switch only, or the second inductor is configured to be coupled to the reference potential by the second low-side switch only.

Example 13

A boost converter for converting an input voltage to an output voltage, comprising: a power stage comprising: a series capacitor having a first terminal coupled to a first switch node; a pair of second high-side switches coupled in series between a second switch node and a second terminal of the series capacitor; a bias switch coupled between the first switch node and a middle node between the second high-side switches, wherein during operation, a voltage across each of the second high-side switches and the bias switch is less than half a supply voltage; a first inductor coupled between the first switch node and an input node; and a second inductor coupled between the second switch node and the input node.

Example 14

The boost converter of example 13, wherein: the first inductor is configured to be coupled to a reference potential by the first low-side switch only, or the second inductor is configured to be coupled to the reference potential by the second low-side switch only.

Example 15

The power stage of any combination of examples 1-14, wherein the voltage converter is a two-phase voltage converter.

Example 16

The power stage of any combination of examples 1-15, wherein during operation, states of each of the second high-side switches is complementary to a state of the bias switch.

Example 17

A method of operating the power stage of any combination of examples 1-16, wherein during a first switching interval, the method comprises: configuring the first high-side switch, the second low-side switch, and the bias switch to be in an on state; and configuring the first low-side switch and the second high-side switches to be in an off state, wherein a first switch node voltage is one half the supply voltage, and the second switch node voltage is at the reference potential.

Example 18

The method of any combination of examples 1-17, wherein during a second switching interval, the method comprises: configuring the first low-side switch, the second low-side switch, and the bias switch to be in an on state; and configuring the first high-side switch and the second high-side switches to be in an off state, wherein first and second switch node voltages are at the reference potential.

Example 19

The method of any combination of examples 1-18, wherein during a third switching interval, the method comprises: configuring the first low-side switch and the second high-side switches to be in an on state; and configuring the first high-side switch, the second low-side switch, and the bias switch to be in an off state, wherein a first switch node voltage is at the reference potential and the second switch node voltage is one half the supply voltage.

Example 20

The method of any combination of examples 1-19, wherein during a fourth switching interval, the method comprises: configuring the first low-side switch, the second low-side switch, and the bias switch to be in an on state; and configuring the first high-side switch and the second high-side switches to be in an off state, wherein a first switch node voltage is at the reference potential and the second switch node voltage is at the reference potential.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A power stage of a voltage converter, comprising:
a series capacitor having a first terminal coupled to a first switch node;
a pair of second high-side switches coupled in series between a second switch node and a second terminal of the series capacitor; and
a bias switch that is the only switch coupled between the first switch node and a middle node between the second high-side switches,
wherein during operation, a voltage across each of the second high-side switches and the bias switch is less than a supply voltage.

2. The power stage of claim 1, further comprising:
a first low-side switch coupled between the first switch node and a reference potential;
a second low-side switch coupled between the second switch node and the reference potential; and
a first high-side switch coupled between the second terminal of the series capacitor and either a supply node when the voltage converter is a buck converter or an output node when the voltage converter is a boost converter.

3. The power stage of claim 1, wherein during operation, a voltage across each of the switches is less than the supply voltage.

4. The power stage of claim 1, wherein during operation, a voltage at the middle node is configured to be maintained at less than the full supply voltage.

5. The power stage of claim 1, wherein during operation, a voltage at the middle node is biased by the bias switch to be at a reference potential or half the supply voltage.

6. The power stage of claim 1, wherein the voltage converter is a two-phase voltage converter.

7. The power stage of claim 1, wherein during operation, states of each of the second high-side switches is complementary to a state of the bias switch.

8. The power stage of claim 2, wherein during a first switching interval, the first high-side switch, the second low-side switch, and the bias switch are configured to be in an on state, and the first low-side switch and the second high-side switches are configured to be in an off state, such that the first switch node voltage is one half the supply voltage, and the second switch node voltage is at the reference potential.

9. A method of operating the power stage of claim 2, wherein during a first switching interval, the method comprises:

configuring the first high-side switch, the second low-side switch, and the bias switch to be in an on state; and configuring the first low-side switch and the second high-side switches to be in an off state, wherein a first switch node voltage is one half the supply voltage, and the second switch node voltage is at the reference potential.

10. The power stage of claim 8, wherein during the first switching interval, the bias switch is configured to bias a voltage at the middle node to the first switch node voltage, such that voltages across each of the second high-side switches are substantially the same.

11. The power stage of claim 8, wherein during a second switching interval, the first low-side switch, the second low-side switch, and the bias switch are configured to be in an on state, and the first high-side switch and the second high-side switches are configured to be in an off state, such that the first and second switch node voltages are at the reference potential.

12. The method of claim 9, wherein during a second switching interval, the method comprises:

configuring the first low-side switch, the second low-side switch, and the bias switch to be in an on state; and configuring the first high-side switch and the second high-side switches to be in an off state, wherein first and second switch node voltages are at the reference potential.

13. The power stage of claim 11, wherein during a third switching interval, the first low-side switch and the second high-side switches are configured to be in an on state, and the first high-side switch, the second low-side switch, and the bias switch are configured to be in an off state, such that the first switch node voltage is at the reference potential and the second switch node voltage is one half the supply voltage.

14. The method of claim 12, wherein during a third switching interval, the method comprises:

configuring the first low-side switch and the second high-side switches to be in an on state; and configuring the first high-side switch, the second low-side switch, and the bias switch to be in an off state, wherein a first switch node voltage is at the reference potential and the second switch node voltage is one half the supply voltage.

15. The power stage of claim 13, wherein during a fourth switching interval the first low-side switch, the second low-side switch, and the bias switch are configured to be in an on state, and the first high-side switch and the second high-side switches are configured to be in an off state, such that the first and second switch node voltages are at the reference potential.

16. The method of claim 14, wherein during a fourth switching interval, the method comprises:

configuring the first low-side switch, the second low-side switch, and the bias switch to be in an on state; and configuring the first high-side switch and the second high-side switches to be in an off state, wherein a first switch node voltage is at the reference potential and the second switch node voltage is at the reference potential.

17. A buck converter for converting an input voltage to an output voltage, comprising:

a power stage comprising:

a series capacitor having a first terminal coupled to a first switch node;

a pair of second high-side switches coupled in series between a second switch node and a second terminal of the series capacitor;

a bias switch that is the only switch coupled between the first switch node and a middle node between the second high-side switches, wherein during operation, a voltage across each of the second high-side switches and the bias switch is less than a supply voltage;

a first inductor coupled between the first switch node and an output node; and a second inductor coupled between the second switch node and the output node.

18. The buck converter of claim 17, wherein:

the first inductor is configured to be coupled to a reference potential by the first low-side switch only, or the second inductor is configured to be coupled to the reference potential by the second low-side switch only.

19. A boost converter for converting an input voltage to an output voltage, comprising:

a power stage comprising:

a series capacitor having a first terminal coupled to a first switch node;

a pair of second high-side switches coupled in series between a second switch node and a second terminal of the series capacitor;

a bias switch that is the only switch coupled between the first switch node and a middle node between the second high-side switches, wherein during operation, a voltage across each of the second high-side switches and the bias switch is less than half a supply voltage;

a first inductor coupled between the first switch node and an input node; and a second inductor coupled between the second switch node and the input node.

20. The boost converter of claim 19, wherein:

the first inductor is configured to be coupled to a reference potential by the first low-side switch only, or the second inductor is configured to be coupled to the reference potential by the second low-side switch only.

* * * * *